(No Model.)

E. PARAF-JAVAL.
REMOVING VEGETABLE FIBER FROM WOOL.

No. 306,346. Patented Oct. 7, 1884.

WITNESSES:
E. B. Bolton
Geo. Bainton

INVENTOR:
Eugene Paraf-Javal
By his Attorneys,
Burke, Fraser & Connets

UNITED STATES PATENT OFFICE.

EUGÈNE PARAF-JAVAL, OF PARIS, FRANCE.

REMOVING VEGETABLE FIBER FROM WOOL.

SPECIFICATION forming part of Letters Patent No. 306,346, dated October 7, 1884.

Application filed November 14, 1882. (No model.) Patented in France December 30, 1881, No. 146,610; in Belgium February 10, 1882, No. 57,034; in England February 27, 1882, No. 951; in Germany March 4, 1882, No. 23,477; in Italy March 31, 1882, No. 13,961; in Spain June 7, 1882, No. 2,695, and in Austria-Hungary June 28, 1882, No. 8,921.

*To all whom it may concern:*

Be it known that I, EUGÈNE PARAF-JAVAL, a citizen of the Republic of France, and a resident of Paris, France, have made certain Improvements in processes for treating animal fibers and fabrics made therefrom for the chemical decomposition of vegetable fibers intermingled therewith, of which the following is a specification.

The employment of an acid to carbonize and destroy the vegetable fibers intermingled with wool and other animal fibers is well known.

My invention relates to certain improvements in the treatment of wool and other animal fibers, and of fabrics made therefrom, with acids for the decomposition and ultimate removal of the vegetable fibers and substances which may be intermixed therewith.

The novel features of the invention relate in part to the general process and in part to the method of neutralizing the acid remaining in the fiber treated, all as will be fully set forth hereinafter, and defined in the claims. I employ anhydrous hydrochloric acid as the agent for carbonizing the vegetable fibers, and I may generate the gas by any of the well-known means usually employed—as, for example, by heating sulphuric acid and common salt in a retort.

Figure 1:
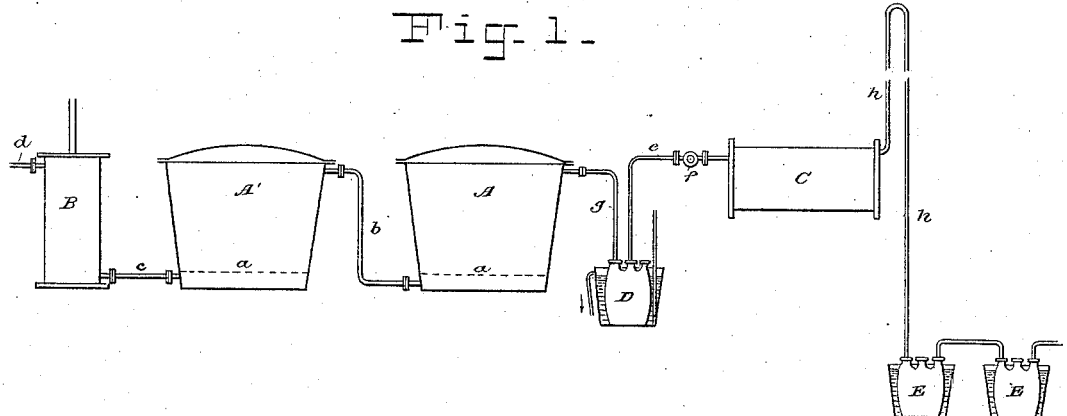
Figure 2:
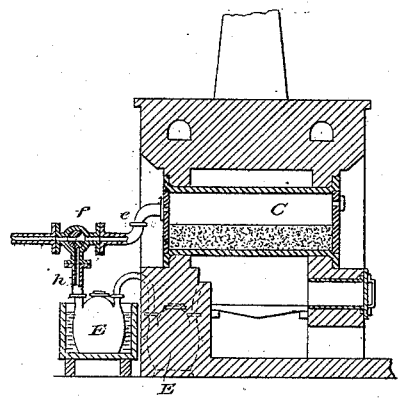

In the drawings which serve to illustrate my invention, Figure 1 is a view illustrating the apparatus employed in carrying out my process. Fig. 2 is a sectional elevation illustrating a slightly-different arrangement of the gas-generating apparatus.

Referring to Fig. 1, A A' are vats to contain the animal fiber, or fabric made therefrom, which is to be treated. These vats have false bottoms $a$ $a$, on which the material is placed, and they may be made of wood, copper, enameled iron, or other suitable material. They are connected by a tube, $b$, extending from the bottom of A to the top of A', and the latter vat is connected at its bottom with an exhaust-pump, ejector, or blower, B, by means of a pipe, $c$. This pump delivers, by an outlet, $d$, the gases and vapors drawn from the vats. The vat A communicates at its upper part with any source of hydrochloric gas, which is shown in Fig. 1 as generated in a retort, C.

From the retort a pipe, $e$, provided with a cock, $f$, leads the gas as it is generated to a vessel, D, where it is cooled and deprived of its aqueous vapors, and from this vessel it passes by a pipe, $g$, to the vat A.

In order to allow the gas to escape from the generator when the cock $f$ is closed, I provide the said generator with a pipe, $h$, which leads the gas to condensing-vessels E E. The pipe $h$ should have sufficient length (about thirty-six feet) to prevent the aqueous hydrochloric acid in the vessels E from re-entering the retort when the cock $f$ is opened and the pump set in motion. The vessels E contain water, and their contents gradually become saturated, and as a considerable number of such vessels are employed no gas escapes into the atmosphere.

The operatoin is as follows: The animal fiber, or fabric made therefrom, is placed in the vats, and they are then hermetically closed. The pump is then set in motion and the cock $f$ closed. This reduces the pressure in the vats, and this reduction is kept up until the pressure has sunk to about 1.5 inch of mercury, when the cock $f$ is opened and the gas from the generator flows into A and permeates the material therein. The heat disengaged (about five hundred calories to two pounds of gas) is instantaneously absorbed by the water of hydration of the wool, and under the influence of the low pressure a quantity of steam is generated containing a large percentage of this heat. This vapor of water or steam, the temperature of which is about 35° centigrade at 1.5 inch mercury pressure, passes through the contents of vat A and into vat A', the contents of which are traversed and heated thereby, and it is eventually drawn out by the pump or exhauster. When the temperature of the material in the vats rises, the cock $f$ is closed, whereby the temperature may be reduced to any required degree. The gas is then again admitted and the operation continued until the whole of the material in A is saturated with gas. As some gas will pass through A toward the end of the operation, the vat A' is interposed between it and the pump in order to prevent any of the gas from reaching the latter. When about one-third or one-fourth of the material in A' has thus become acidulated by the excess of gas from A, the cock *f* is closed, the vat A is removed, and A' is made to occupy its place, while a fresh vat is set in the place of A' between A' and the pump.

The above-described operation is continued until the substituted vat has received sufficient gas, and so on. When no more gas is generated in the retort C, the rarefaction produced by the pump carries off a great portion of the gas dissolved in the water in the vessels E E, and causes it to pass over into the vat A, where it is utilized. The liquid thus desaturated in the vessels E E is then again capable of absorbing fresh quantities of gas, and these vessels are consequently capable of serving for an indefinite time, the quantity of water lost by evaporation, however, being made good.

Though not herein shown, the cock *f* is in or may be in communication with another generator precisely like C, and provided in a like manner with vessels E E.

I may employ any number of vats, although but two are shown.

I prefer to operate at temperatures ranging from 25° to 45° centigrade, (or 77° or 113° Fahrenheit.)

Each vat having been saturated with gas, as above described, I prefer to let it rest for from six to twelve hours, and after that to empty it and expose its contents to the air, in order to obtain greater friability of the vegetable fiber, and this operation should be carried on in well-ventilated apartments. When, by reason of too great dryness, the weakening of the vegetable fiber proceeds too slowly, I agitate the acidified materials in an atmosphere moistened by acid vapors or watery spray. This agitation may be effected either by a fork on the floor, or by rotation in an open or slatted cylinder. The desired friability of the vegetable fiber having been attained, the material is washed with water, with which is mixed, by preference, pulverized mineral phosphate of lime rich in carbonate of lime. The excess of the phosphate should be such as to neutralize the acid and prevent any acidification of the bath. I may employ carbonates of baryta, strontium, or magnesia; but I prefer the carbonate of lime as being the best. The last rinsings should be in pure water. The employment of phosphate of lime permits the recovery of the excess of hydrochloric acid employed for cleansing, for all the carbonate of lime thus produced will diminish by so much the sulphuric acid that will be necessary ultimately in the manufacture of soluble phosphates. As the refuse vegetable matter remains mixed with the phosphate, this is separated by levigation.

Referring now to Fig. 2, I will describe the modification of the apparatus for generating the hydrochloric gas shown therein. In this case *f* is a three-way cock, and when it is turned in one direction the gas generated in C leads directly to the vat A, (or through a vessel, D, if desired,) and when the cock is turned to cut off the communication between the generator and the vat, the generator is put into communication with the absorbing-vessels E; or the said vessels may be put into communication with the vat and the cut-off from the generator.

Having thus described my invention, I do not claim as new the decomposition of vegetable matters in wool by the use of hydrochloric acid or gas, as this is not new; but what I do claim is—

1. The herein-described method of neutralizing the acid remaining in the animal fiber treated as herein described, which consists in first washing said fiber in water wherewith is mixed mineral phosphate of lime rich in carbonate of lime, and then giving said fiber an afterwash in pure water, as set forth, whereby the excess of hydrochloric-acid gas is the better utilized.

2. The herein-described method of treating animal fibers and fabrics made therefrom for the purpose of decomposing by acids the vegetable fibers intermingled therewith, which consists in first placing the animal fiber or fabric made therefrom in hermetically-closed vats connected in series; then exhausting the air from said vats; then admitting hydrochloric gas to the first vat of the series while the exhaustion continues from the last vat of the series; then, when the contents of the first vat are saturated with the gas, removing this vat and placing a newly-charged vat in place, as described; then after the vat removed has been allowed to stand from six to twelve hours, exposing its contents to the air, as described; then washing the fiber thus treated with a mixture of water and pulverized mineral phosphate of lime rich in carbonate of lime, in order to neutralize the acid, and finally washing the fiber in pure water, all substantially as and for the purposes set forth.

In witness whereof I have hereunto signed my name in the presence of two subscribing witnesses.

EUGÈNE PARAF-JAVAL.

Witnesses:
MATHIAS PARAF-JAVAL,
CHARLES NARDEBO.